Figure 1:
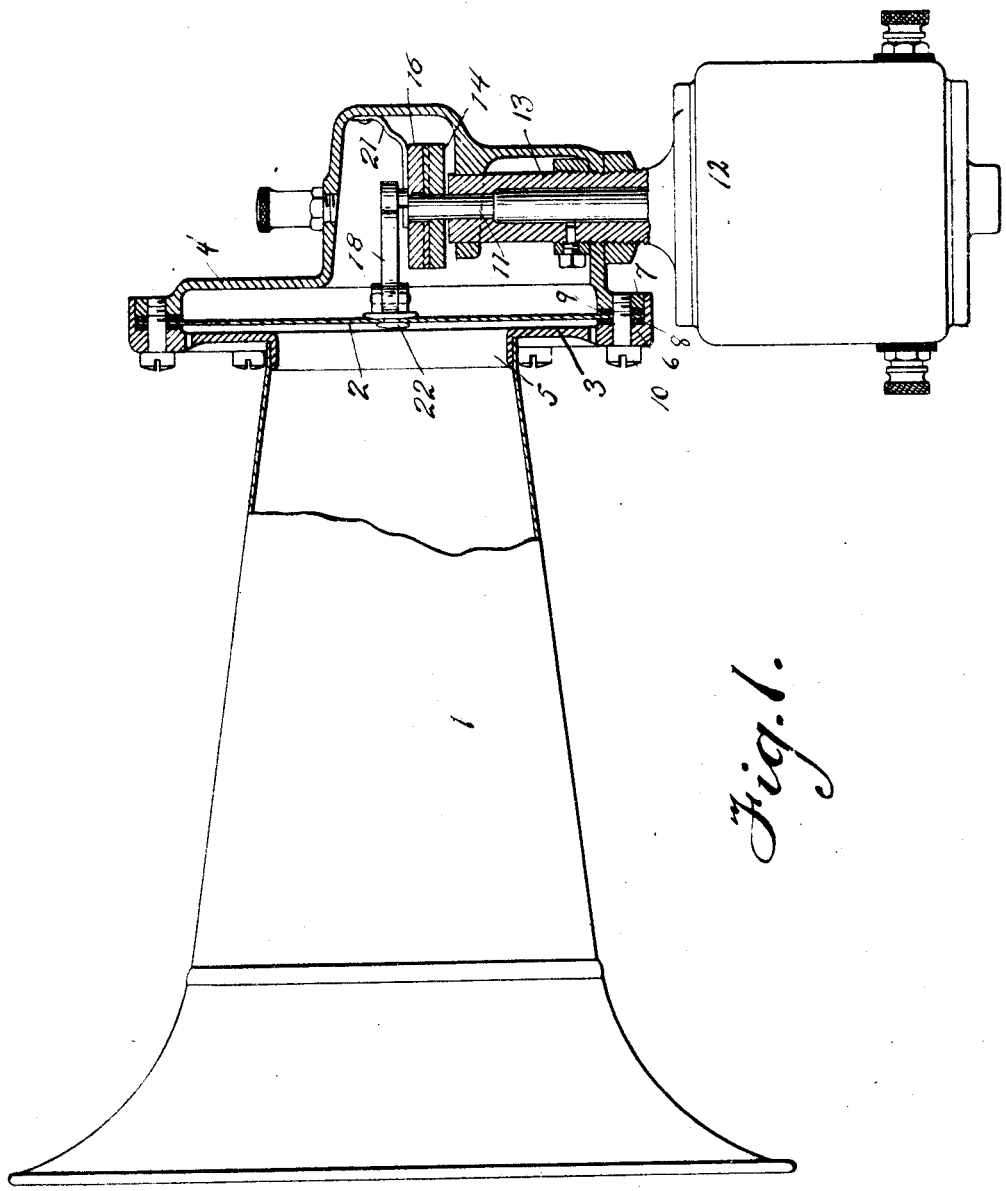

M. R. HUTCHISON.
DIAPHRAGM HORN.
APPLICATION FILED MAY 11, 1911.

1,192,899.

Patented Aug. 1, 1916.
2 SHEETS—SHEET 1.

WITNESSES
G. Robert Thom.

INVENTOR
Miller Reese Hutchison
BY
G. C. Dean ATTORNEY

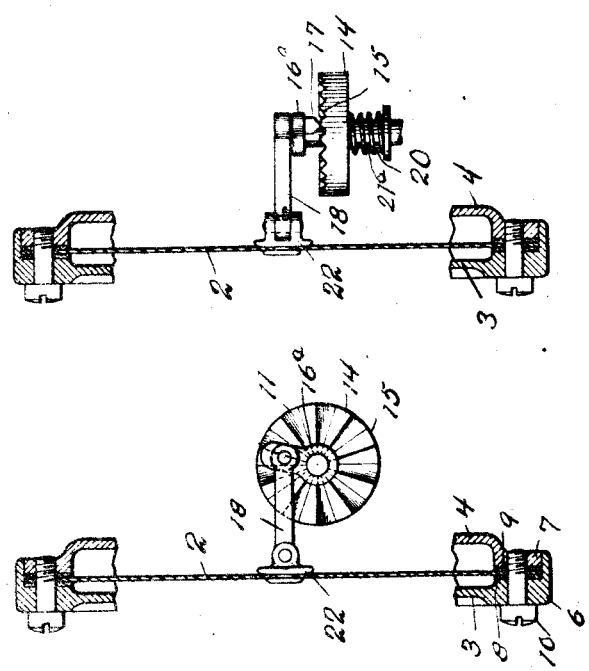

UNITED STATES PATENT OFFICE.

MILLER REESE HUTCHISON, OF WEST ORANGE, NEW JERSEY, ASSIGNOR TO LOVELL-McCONNELL MANUFACTURING COMPANY, A CORPORATION OF DELAWARE.

DIAPHRAGM-HORN.

1,192,899. Specification of Letters Patent. Patented Aug. 1, 1916.

Application filed May 11, 1911. Serial No. 626,492.

*To all whom it may concern:*

Be it known that I, MILLER REESE HUTCHISON, a citizen of the United States, and resident of West Orange, in the county of Essex and State of New Jersey, have invented certain new and useful Improvements in Diaphragm-Horns, of which the following is a specification.

This invention relates to mechanically-actuated diaphragm alarm or signaling devices, adapted for use on vehicles, boats, factories and elsewhere. In my prior application filed June 7, 1910, Serial Number 565,564, I have disclosed a device of this character in which the diaphragm is actuated by coöperating friction members, one being preferably a rotary driving member driven preferably by power means, such as an electric motor, and the other being preferably an oscillatory driven member coupled to or associated with the diaphragm, the driven member of such an assemblage being alternately frictionally coupled to and released from the driving member so as to execute rapid to and fro movement, thereby causing the diaphragm to vibrate and produce a note suitable for the purposes in view. In the particular preferred embodiment illustrated in that application the friction surfaces were smooth. The frequency and amplitude of vibration of the diaphragm were dependent on the stiffness and inertia thereof, the character of the surfaces, the magnitude of the force holding them together, and the speed of rotation. These principles are generally applicable to the embodiment of grip-and-slip operating signal disclosed in the present application. In the present instance I propose to modify the action in certain particulars by utilizing toothed interfitting surfaces, so that there is a mechanical meshing between the driving and driven members and a mechanical camming of the one away from the other at the occurrence of the slips. These toothed, grip-and-slip, driving and driven members may take a great variety of forms and they may actuate the diaphragm through a variety of connections, either in the nature of loose connections or tight couplings, though preferably the latter. In the simplest construction the driven member is connected to the diaphragm by a bar or link. This connection may be either a thrust member or a tension member. In the latter instance, especially, it is preferably coupled to the diaphragm as well as to the driven member.

The formation of the teeth or meshing projections on the driving and driven members will be determined by the conditions and the objects in view. Preferably, they have inclined sides on the working side so as reliably to cam each other out of engagement when the proper moment for the slip occurs. Better results, particularly in the manner of the reëngagement of the teeth at the conclusion of the slip, are obtained by inclining the teeth on both sides. The grip-and-slip action will be largely governed by the pitch of the teeth. Care must be observed that the pitch be not so steep as to be beyond the critical angle at which slipping will not occur under the push or pull of the diaphragm since the result would be to rupture the latter. In general, the steeper the pitch, the deeper the valleys between the teeth, and the more accurate the fit of the teeth into each other, the more reluctantly will the members separate under the elastic tension of the diaphragm or other force opposing the dragging of the driven by the driving member, and consequently the greater will be the displacement of the diaphragm in one direction and of its elastic return in the other direction. With smooth surfaces such as shown in my prior application referred to, the grip-and-slip action was very largely governed by the natural frequency and amplitude of vibration of the diaphragm or by the diaphragm fortified in its vibration by a synchronous resonator. Thus, the signal was self-governing so as to hold the diaphragm to vibration synchronous with the resonator, which is the condition giving maximum sound output for power expended. This governing action is present in large measure in the present signal; though the governing may be affected in greater or less measure by the presence of the teeth, since for a given speed, or for speeds between given limits, the engagement and reëngagement of the teeth will have some tendency to establish a certain range of movement for the driven member.

In the accompanying drawings illustrating the invention by means of certain of the various possible embodiments thereof: Figure 1 is a view of a horn signal embodying the invention, the signal being shown partly in section and partly in elevation; Fig. 2 is a side sectional view showing the diaphragm and driving and driven members, the case being broken away; Fig. 3 is a similar view showing another form of the invention; Fig. 4 is a plan view of this form; and Fig. 5 is a similar plan view showing still another form.

In the several views, the numeral 1 indicates a suitable resonator-projector, and 2 a diaphragm, it being understood that the resonator is preferably so proportioned as to be synchronous with the natural or a prominent frequency of the diaphragm. The diaphragm is preferably held in a suitable case, consisting of a front section 3 and a rear section 4. The base of the resonator is secured to the front section in line with the sound-emitting opening 5 therein. The diaphragm is preferably clamped in place at its margins by clamping portions 6, 7 of the case sections and cork washers or the like 8, 9, clamping bolts or screws 10 passing through registering openings in the parts.

The driving shaft 11 is preferably, though not necessarily, disposed parallel to the diaphragm. It is preferably driven by power means, and more particularly by an electric motor (not shown) which is inclosed in the casing 12 and may be of the type disclosed in my prior application, Serial No. 494,120 filed May 5, 1909, Patent No. 1,160,900 granted Nov. 16, 1915. The shaft 11 is preferably the armature shaft, and its bearing 13 may be extended into the rear section of the diaphragm case, constituting means for holding the diaphragm case and motor case together. The driving and driven members may be of any suitable form.

In the form illustrated more particularly in Fig. 2, the driving member is a disk 14 mounted on and rotated by the shaft, and provided on one side with radial teeth 15, inclined on the advancing sides. The driven member is shown here as a similar disk 16 loosely mounted on the shaft, with the teeth of its corrugated face adapted to fit into the spaces between the teeth on the driver. The driven member is connected with the diaphragm by means of a link or bar 18, which is shown pivoted to the driven member. In order to permit of the slip of the driven member over the driving member, it is necessary to provide for a relative yielding between the members. Either or both of the members may be yieldable. In the present form I have shown the driven member yieldable away from the driving member. Means are provided for holding the members together with suitable force, for which purpose I may employ a spring 21, suitably mounted and pressing against the other face of the driven member.

Whether the connection or link 18 is tightly coupled to the diaphragm or not depends upon whether it is to act as a tension member or a thrust member, and this in turn depends upon the direction of rotation, that is, a tension member should be coupled, a thrust member need not. I have shown it pivotally connected to an anchorage 22 suitably secured to the diaphragm.

In operation, under rotation of the toothed driver, the toothed driving member is alternately dragged thereby, placing the diaphragm under elastic tension, and slips back when the tension of the diaphragm overcomes the force holding the members together. At the conclusion of each slip the spring 21 causes the members to reëngage and remain in engagement until the tension of the diaphragm is such as to cam the members apart.

Figs. 3 and 4 illustrate a slightly different arrangement, in which the driving member 14 is the yieldable part, being pressed against the driven member 16ª by a spring 21ª. The driven member is here shown as an arm or carrier pivoted on the shaft and carrying a single inserted tooth 17 conforming to the recesses in the driver. The link 18 is shown pivoted to the stem of this tooth, for convenience. In fact, the link might carry the tooth, in which case the part 16ª would be merely a guide member.

In Fig. 5 the driven member 16 has two oppositely extending arms, each provided with a radial tooth 17ᵇ formed thereon corresponding to the teeth of the driver. Numerous other embodiments are possible.

I claim:

1. In an alarm or signaling device, a diaphragm, and mechanical means for actuating the same comprising a rotary driving member and an oscillatory driven member, said members possessing interengaging cam teeth and recesses, the driven member being connected with the diaphragm, and means for holding said members coupled frictionally and yieldingly together, whereby the members are successively gripped together so that the driven member is dragged by the driving member, and uncoupled by the increasing tension of the diaphragm to permit the members to cam apart against the action of said holding means so that the driven member may slip back under the action of the diaphragm.

2. In an alarm or signaling device, a diaphragm, and mechanical means for actuating the same comprising a rotary driving member and an oscillatory driven member, said members possessing interengaging cam teeth and recesses, a link connecting the driven member with the diaphragm, and means for holding said members coupled frictionally and yieldingly together so that the driven member is dragged by the driving member, and uncoupled by the increasing tension of the diaphragm to permit the members to cam apart against the action of said holding means so that the driven member may slip back under the action of the diaphragm.

3. In an alarm or signaling device, a diaphragm, and mechanical means for actuating the same, comprising toothed grip and slip members, means for driving one of the members, and means whereby the movement of the other member with the driving member causes the diaphragm to vibrate and produce sound.

4. A diaphragm alarm or signal having actuating means comprising coöperating grip and slip members possessed of coupling projections and recesses, means for driving one of said members, and tensional means for opposing the movement of the other member while coupled with the driving member and producing separation thereof and retrograde movement of the driven member.

5. In an alarm or signal, a diaphragm and actuating means comprising coöperating grip and slip members possessed of coupling projections and recesses, one of said members being the driving member and the driven member associated with the diaphragm so as to be yieldingly restrained thereby so as to execute to and fro, coupled and uncoupled, movements, under the actuation of the driving member.

6. In an alarm or signal, a resilient member and actuating means comprising coöperating grip and slip members possessed of coupling projections and recesses, one of said members being the driving member and the driven member being tensionally restrained by said resilient member so as to execute to and fro, coupled and uncoupled, movements, under the actuation of the driving member, and yielding means for holding said members coupled and restoring them to coupled relation.

7. In an alarm or signal, actuating means comprising coöperating grip and slip members possessed of coupling projections and recesses, one of said members being the driving member and means for driving this member, and a diaphragm arranged to restrain the driven member from extended movement while coupled with the driving member, whereby the driven member executes to and fro movement under the alternate actuation of the driving member and the diaphragm.

8. In an alarm or signal, actuating means comprising coöperating grip and slip members possessed of coupling projections and recesses, one of said members being the driving member and the other the driven member, a diaphragm, and a link coupling the driven member to the diaphragm so that the diaphragm opposes the movement of the driven member coupled with the driving member.

9. In a diaphragm alarm or signal, a driven member mounted for to and fro movement, a uni-directional driving member, said members having frictionally engaging meeting portions provided with coupling and camming projections and recesses, and being separable to a distance permitting them to clear each other, yielding means for holding said members coupled, and a diaphragm adapted to exert increasing resistance to the movement of the driven member while coupled to the driving member and to cause said projections and recesses to cam the members apart.

10. In an alarm or signal and in combination coöperating grip-and-slip members having frictionally engaging meeting portions provided with coupling and camming projections and recesses, said members being yieldingly held together and being separable to a distance permitting them to clear each other, and resilient means for producing intermittent slip movement between the members with attendant camming apart of the members by said projections and recesses.

11. In an alarm or signaling device, the combination of a diaphragm, a resonator co-acting therewith, and mechanism under the control of the diaphragm and resonator for setting up vibration in the former, said mechanism comprising coöperating grip-and-slip members having frictionally engaging meeting portions provided with interengaging projections and recesses, means for driving one of said members, and connection between one of the members and the diaphragm, whereby the action of the members actuates the diaphragm.

12. In a horn or signaling device, the combination of an elastic diaphragm having a fairly definite amplitude and frequency of bodily vibration, a diaphragm casing, a shaft disposed substantially parallel with said diaphragm and extending into said casing, means for rotating said shaft at high speed, two members carried by said shaft within said casing and relatively movable longitudinally of the shaft, one of said members being held against relative rotation in respect to said shaft and the other of said members being capable of relative rotation in respect to the shaft and adapted to vibrate the diaphragm by a movement about the axis of the shaft as a center, and a spring for pressing said members together and permitting an axial movement of one member in respect to the other and a relative rotation determined by the governing action of the diaphragm.

Signed at New York city, in the county of New York, and State of New York, this 9th day of May, A. D. 1911.

MILLER REESE HUTCHISON.

Witnesses:
IRVING M. OBRIEGHT,
JAMES D. BROWN.